A. BINK.
POWER TRANSMISSION MECHANISM.
APPLICATION FILED JUNE 29, 1908.
931,987.
Patented Aug. 24, 1909.
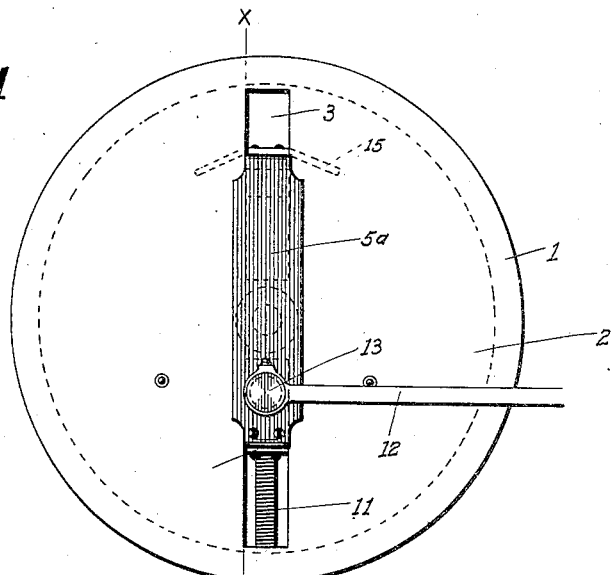
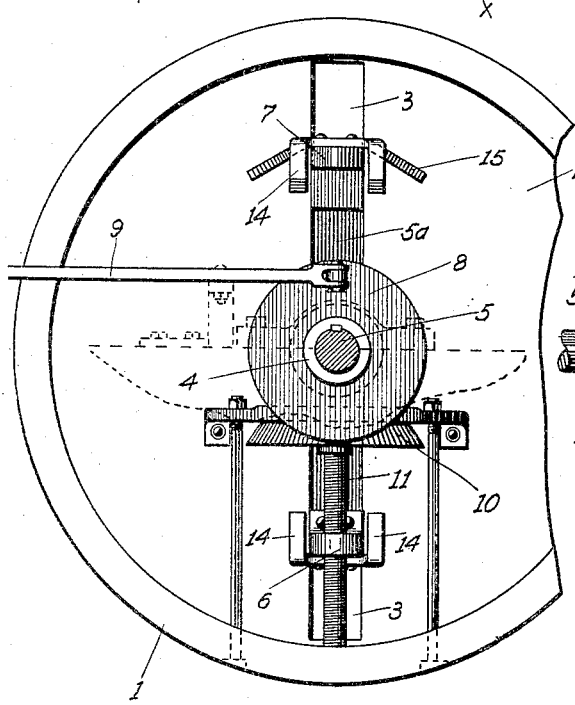
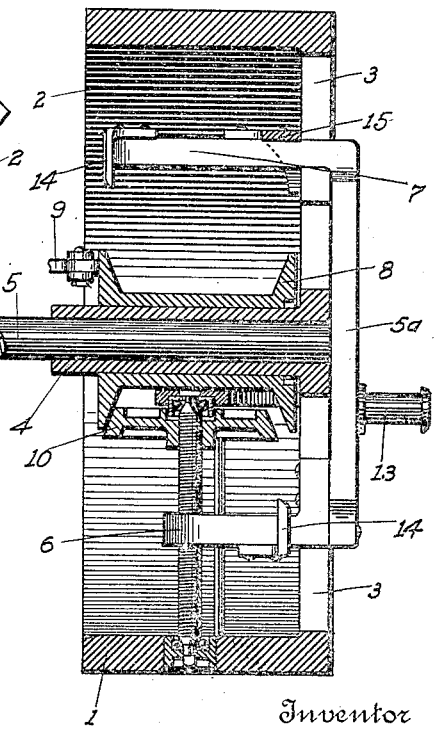
Witnesses
Frank H. Carter
J. B. Webster
Inventor
Anthony Bink
by Percy S. Webster
Attorney

UNITED STATES PATENT OFFICE.

ANTHONY BINK, OF STOCKTON, CALIFORNIA.

POWER-TRANSMISSION MECHANISM.

931,987.

Specification of Letters Patent.   Patented Aug. 24, 1909.

Application filed June 29, 1908. Serial No. 440,851.

*To all whom it may concern:*

Be it known that I, ANTHONY BINK, a citizen of the United States, residing at Stockton, in the county of San Joaquin, State of California, have invented certain new and useful Improvements in Power-Transmission Mechanism; and I do declare the following to be a full, clear, and exact description of the same, such as will enable others skilled in the art to which it appertains to make and use the same, reference being had to the accompanying drawings and to the characters of reference marked thereon, which form a part of this application.

This invention relates to improvements in power driven machines and particularly the drive or transmission gears thereof, the object of the invention being to produce a gear by which the transmission stroke of the driving rod may be regulated as required in a quick and effective manner without loss of time, and with no stoppage of the machinery and with a minimum of friction and loss of power. Also to produce a simple and inexpensive device for the purpose. These objects I accomplish by means of a driving drum or pulley, having a slotted face, said face being flush with the outer rim of said drum, a hub mounted on the driving shaft and keyed to said shaft, a crank on the outside of said face, having a wrist or crank pin thereon, and arms projecting into said drum, a friction spool slidably mounted on said hub, a friction wheel engaging said spool to rotate a screw pin to move said arms and crank iron in said slots whereby the wrist or driving pin on the same will be moved diametrically with respect to the drum, thereby shortening or lengthening the stroke of the driving rod on said pin, as desired; also by such other and further construction as will appear by a perusal of the following specification and claims.

In the drawings similar characters of reference indicate corresponding parts in the several views.

Figure 1 is a front face view of the driving drum and rod showing my improvements thereon. Fig. 2 is a fragmentary view of the rear face on said drum and parts. Fig. 3 is a sectional view taken on a line $x-x$ of Fig. 1.

Referring now more particularly to the characters of reference 1 designates the driving drum or pulley having a front face or disk 2 provided with diametrically disposed slots 3.

4 is a hub forming a part of said face 2, said hub being keyed onto the drive shaft 5. On the outside of said face, but unattached thereto is a crank-iron $5^a$, having inwardly projecting arms 6 and 7 being slidably disposed in said slots.

On the hub 4 is a slidable friction spool 8 having an operating handle 9 with which spool a friction wheel 10 engages to rotate a screw pin 11 suitably journaled within said drum 1 and screwed through the arm 6, whereby when the spool 8 is thrown into engagement with the wheel 10 by means of the handle 9 the screw 11 will rotate to move the arms 6 and 7 and drive crank-iron $5^a$ up or down to shorten or lengthen the stroke permitted the driving rod 12 mounted on the wrist pin 13 on the projected member $5^a$.

To prevent the machine from wrenching when a limit of movement is reached, I have provided fingers or lugs 14 on the arms 6 and 7 which project between and disengage the spool 8 and wheel 10 when such limit is reached, thereby stopping the movement of the said arms.

In the foregoing description I have specified friction wheels for the device, but either cog or friction wheels may be used, cogs being preferable for low speeds, and friction for high.

From the foregoing description it will be readily seen that I have produced a simple and effective device which substantially fulfils the objects of the inventions, as set forth herein.

While this specification sets forth in detail the present and preferred construction of the invention still in practice, such deviations from such detail may be resorted to as do not form a departure from the spirit of the invention.

Having thus described my invention, what I claim as new and useful and desire to secure by Letters Patent is:—

1. In a device of the character described a drum, having guide slots, disposed diametrically therein, arms slidably disposed in said slots, a hub in said drum and formed as a part thereof, a spool mounted on said hub, an operating lever connected therewith and means connected intermediate said arms and said spool for sliding said arms in said slots.

2. In a device of the character described the combination of a drum having diametrically disposed slots in its face, a hub formed as a part of said drum, a spool slidably mounted onto said hub, an operating lever connected therewith a screw pin disposed radially within said drum, a friction wheel on said pin engageable with said spool and arms movable on said pin and projecting through said slots.

3. In a device of the character described the combination of a drum having diametrically disposed slots in its face, a hub formed as a part of said drum, a spool slidably mounted onto said hub, an operating lever connected therewith a screw pin disposed radially within said drum, a friction wheel on said pin engageable with said spool and arms movable on said pin and projecting through said slots, said arms having lugs engageable with said spool when said arms make a predetermined movement, as set forth.

4. A device of the character described comprising a drum provided with diametrically disposed slots in its face, a hub formed on said drum, a driving shaft keyed within said hub, a crank iron having arms projecting into said slots, a crank on said iron, a friction spool slidably mounted on said hub, an operating lever connected therewith, a screw pin mounted radially in said drum, a friction wheel on said screw pin, engageable with said spool, one of said arms being screw mounted on said screw pin.

In testimony whereof I affix my signature in presence of two witnesses.

ANTHONY BINK.

Witnesses:
 FRANK H. CARTER,
 J. B. WEBSTER.